US007487330B2

(12) United States Patent
Altman et al.

(10) Patent No.: US 7,487,330 B2
(45) Date of Patent: Feb. 3, 2009

(54) METHOD AND APPARATUS FOR TRANSFERRING CONTROL IN A COMPUTER SYSTEM WITH DYNAMIC COMPILATION CAPABILITY

(75) Inventors: Erik R. Altman, Danbury, CT (US); Kemal Ebcioglu, Katonah, NY (US); Michael Karl Gschwind, Mohegan Lake, NY (US); David Arnold Luick, Rochester, MN (US)

(73) Assignee: International Business Machines Corporations, Armonk, NY (US)

( * ) Notice: Subject to any disclaimer, the term of this patent is extended or adjusted under 35 U.S.C. 154(b) by 1244 days.

(21) Appl. No.: 09/847,776

(22) Filed: May 2, 2001

(65) Prior Publication Data

US 2004/0044880 A1 Mar. 4, 2004

(51) Int. Cl.
G06F 15/00 (2006.01)
G06F 15/76 (2006.01)
(52) U.S. Cl. ....................................................... 712/43
(58) Field of Classification Search ................. 712/213, 712/227
See application file for complete search history.

(56) References Cited

U.S. PATENT DOCUMENTS

| 4,809,170 | A | * | 2/1989 | Leblang et al. | 717/122 |
| 6,202,132 | B1 | | 3/2001 | Islam et al. | 711/141 |
| 6,292,939 | B1 | * | 9/2001 | Itou et al. | 717/149 |
| 6,351,844 | B1 | * | 2/2002 | Bala | 717/128 |
| 6,381,678 | B2 | * | 4/2002 | Fu et al. | 711/137 |

OTHER PUBLICATIONS

IEEE Computer Mar. 2000 "Dynamic and Transparent Binary Translation" M. Gschwind et al pp. 54-59.
ACM/IEEE 32nd Intl. Symposium on Microarchitecture, "Optimizations and Oracle Parallellism with Dynamic Translation" K. Ebcioglu.
ACM/IEEE Computer Sigplan Notices vol. 22, #7 Jul. 1987 "Mimic: A Fast System/370 Simulator" Cathy May.
M. K. Gschwind, "Method and apparatus for determining branch addresses in programs generated by binary translation" Research Disclosure, vol. 41, #416, article 41698, Dec. 1998.
Computer IEEE 1993 "An Architectural Framework for Supporting Heterogeneous Instruction-Set Architectures" Gabriel M. Silberman et al pp. 39-56, Jun. 1993.

* cited by examiner

Primary Examiner—Eddie P Chan
Assistant Examiner—Brian P Johnson
(74) Attorney, Agent, or Firm—Louis J. Percello; Brian P Verminski; David Aker (57) ABSTRACT

In a dynamically compiling computer system, a system and method for efficiently transferring control from execution of an instruction in a first representation to a second representation of the instruction is disclosed. The system and method include the setting of a tag for entry points of each instruction in a first representation that has been translated to a second representation. The tag is stored in memory in association with each such instruction. When a given instruction in a first representation is to be executed, the tag is examined, and if it indicates that a translated version of the instruction has previously been generated, control is passed to execution of the instruction in the second representation. The second representation can be a different instruction set representation, or an optimized representation in the same instruction set as the original instruction.

15 Claims, 8 Drawing Sheets

METHOD AND APPARATUS FOR TRANSFERRING CONTROL IN A COMPUTER SYSTEM WITH DYNAMIC COMPILATION CAPABILITY

BACKGROUND OF THE INVENTION

1. Field of the Invention

The present invention generally relates to computing systems employing dynamic compilation, such as dynamic optimization and binary translation techniques, and more particularly to a method and apparatus for transferring control from the execution of a portion of a first representation of a program to a portion of the program in a second representation of the program.

2. Description of the Related Art

Dynamic optimization is the transformation of a program's description from a first representation in a particular instruction set—this usually being the original representation as generated by the programmer and his tools—into a second representation of the program in the same instruction set, the second representation being able to better exploit the characteristics of a given microprocessor implementing said instruction set given the characteristics of the particular instance of the program. Dynamic optimization employs a number of techniques including instruction scheduling, speculative execution, common subexpression elimination, code motion, loop optimization, code layout and so forth. Ebcioglu, Altman, Gschwind, Sathaye, "Optimizations and Oracle Parallelism with Dynamic Translation", ACM/IEEE 32nd International Symposium on Microarchitecture, Haifa, Israel, November 1999, give an overview of such techniques and their use in a system.

Dynamic binary translation is the transformation of a program's description from a first representation in a first instruction set—this usually being the original representation as generated by the programmer and his tools—into a second representation of the program in a second instruction set, the second representation being able to better exploit the characteristics of a given microprocessor implementing said instruction set given the characteristics of the particular instance of the program and the second instruction set offering some desirable characteristics to be exploited by the second representation, such as the ability to express parallel operations in long instruction words such as to better exploit instruction level parallelism inherent in programs, or simplicity to implement such as to reduce design time, design cost, die size, or power consumption, or compatibility with an architecture having a large installed base or with a newly introduced emerging architecture, or to offer any number of other advantages a particular instruction set may have. Gschwind, Altman, Sathaye, Ledak, Appenzeller, "Dynamic and Transparent Binary Translation", IEEE Computer, pages 54-59, March 2000 give an example of a high-performance binary translation system translating the IBM PowerPC (TM) architecture to the BOA long instruction word architecture.

Dynamic optimization and dynamic binary translation are collectively referred to as dynamic compilation.

Traditionally, dynamic compilation systems have consisted of two distinct phases: a first interpretation phase in which instructions from a first interpretation of a program are interpreted once or multiple times, and finally compiled into a second representation which is emitted into a pool of code fragments. When the interpretation system discovers an address for which a translation already exists, it suspends interpretive execution and transfers to the code fragment in the second representation which implements the desired functionality. Code then executes at full speed, possibly transferring from one fragment of compiled code to the next, until a new section of code is discovered which does not yet have a corresponding fragment in the second representation.

The first interpretative phase serves a multitude of purposes, such as deciphering the semantics and structure of the program in a first representation, providing an initial means for executing the program while profiling information is gathered to characterize the behavior of the program, and finally to avoid the translation of infrequently executed code.

The importance of the last purpose of interpretation, namely to provide a filter which selects the instructions which will actually be compiled, should be evident from the fact that it takes tens to hundreds of cycles to interpret a single instruction from the first representation, but takes thousands (or more) cycles to compile an instruction from the first representation to its counterpart in the second representation. Execution speed of a single instruction when executed natively is a few cycles (usually 1-5 cycles per instruction (CPI), depending on instruction complexity, workload characteristics, system configuration such as MP characteristics, and the performance of a particular core). After optimization, an instruction from the original representation may execute at native speeds slightly higher than in the original program, but the improvement usually corresponds to a very low absolute number (usually fractions of a cycle). Thus to improve overall program execution, every translated instruction must be executed sufficiently often to amortize its own translation cost, as well as other system overheads such as interpretation and system housekeeping. Thus, unless high code reuse is present in an application, dynamic compilation cannot improve program execution performance and it may actually deteriorate significantly.

Silberman and Ebcioglu, "An Architectural Framework for Supporting Heterogeneous Instruction-Set Architectures", IEEE Computer, June 1993 introduced a revolutionary concept in which binary translation would be used to actually improve execution speed through the combined use of dynamic binary translation and dynamic optimization. This approach is based on the design of a high-performance VLIW architecture to which instructions from the original architecture are translated. To reduce the interpretation cost, the proposal uses two engines, a native code engine and a migrant engine. In this design, the migrant engine is responsible for compatible execution of legacy code whereas the native engine executes optimized code for a simpler, high performance architecture, e.g., a superscalar or VLIW design. This design uses a switch table which contains the address of code entry points into the native shadow code, giving a correspondence between native and migrant code addresses. When a jump instruction is attempted, the architecture performs a lookup of the migrant target address, to determine if a translation exists for the target address within the native shadow code. If an entry exists, control is transferred to executing the native (shadow) code representation of the program.

This approach is limited by the design constraints for the switch table. To achieve high performance, the switch table has to be implemented using a content-addressable memory (CAM) structure. However, the size (i.e., the number of entries) of CAM structures is inherently limited by the capabilities of the CAM structures, and large numbers of entries lead to slow circuitry which limits processor frequency. If a CAM structure is not used to provide single cycle table access, the design incurs a significant CPI penalty, in that multiple cycles may be required to implement a branch that includes a switch table lookup.

As has been described, one major aspect of dynamic compilation is a tradeoff between the gains which can be made from the dynamic optimization, and overheads which are incurred by the process of interpretation and compilation. While compilation is a necessary condition in a dynamic compilation system, much penalty could be avoided in programs exhibiting significant amounts of code with low reuse by reducing or eliminating the cost of interpretation.

Methods advocated in the past involve replacing the instruction at which a transfer should occur with a special JUMP or BRANCH instruction, but this intrusive approach changes the code, as well as the expected result for code which also interprets its own code as data, e.g., to compute a checksum to ensure program integrity. Non-intrusiveness, therefore, clearly has advantages, but heretofore has also had a number of undesirable properties, such as not dealing well with code modifications occurring during program execution, the handling of code in read-only segments, and self-referential code.

Thus, systems employing known switch monitors suffer either excessive memory consumption requirements if a switch monitor as described in May, "Mimic: A Fast S/370 Simulator", ACM SIGPLAN 1987 Symposium on Interpreters and Interpretive Techniques, 1987, is used wherein a switch entry is associated with each migrant instruction address, or from massive hardware requirements if all known entries are to be stored in a CAM memory structure, or from slow performance.

SUMMARY OF THE INVENTION

Therefore, it is evident that a method and apparatus is necessary to transfer control between two representations of a program, one representation being the original representation of the program, the second representation having been generated by a process of dynamic compilation, which method and apparatus (1) are non-intrusive, (2) allow self-referential programs to run correctly, and (3) are scalable, in particular not limited by arbitrary table sizes, and other such artifacts.

The present invention improves on prior switching techniques because the determination of whether a translation exists can be performed by the relatively fast technique of examining a field within a code tag for an instruction, rather than performing an expensive table lookup operation for the address of each instruction being executed from the first representation. The invention is non-intrusive since it does not involve modification of the program representation itself, but rather uses a separate tag associated with the program representation, and since the program representation is not changed, no problems occur with self-referential code. Further, since the switching decision information may be stored as a tag with its associated instruction word, each instruction word is transferable to a second representation, there being no table to limit the number of possible transfer points (as there is in MIMIC, discussed above). In one embodiment of the invention, the number of tag bits can be reduced to less than one bit per instruction starting point if one bit is shared across multiple instructions. In the foregoing ways the current invention to improve switch detection and translation without unduly degrading performance or posing massive hardware requirements.

The invention achieves the foregoing objectives by providing, in a computing system that includes dynamic compilation capability, a method for controlling the execution of an instruction, comprising the steps of translating an instruction from a first representation to a translated representation, setting a tag associated with the instruction in the first representation, prior to execution of a given instruction in the first representation, examining the tag associated with the given instruction, and if such associated tag has been set, branching to the translated version of the given instruction.

DETAILED DESCRIPTION OF PREFERRED EMBODIMENTS OF THE INVENTION

The present invention decouples the detection of code transfers (i.e., transfers from a first (migrant) representation to a second (native) representation) from the mapping of code addresses corresponding to the control transfer. By doing so, it is possible to exploit the different characteristics of the transfer decision and the actual transfer step. In particular, it is important that it be possible to determine quickly, for every instruction in the first representation, if a control transfer is possible to an entry point in a second representation of the instruction. This decision has to be performed without incurring any unnecessary overhead in the execution of code from the first program representation. Once a decision to transfer control is made, the address mapping between the current instruction in the first representation and an entry point in the second representation can be effected normally. It should be noted that although conceptually the lookup step is performed after the decision to perform a control transfer, it can in fact be executed speculatively in parallel with the control transfer decision mechanism in order to reduce critical paths in the execution of a control transfer.

Figure 1:
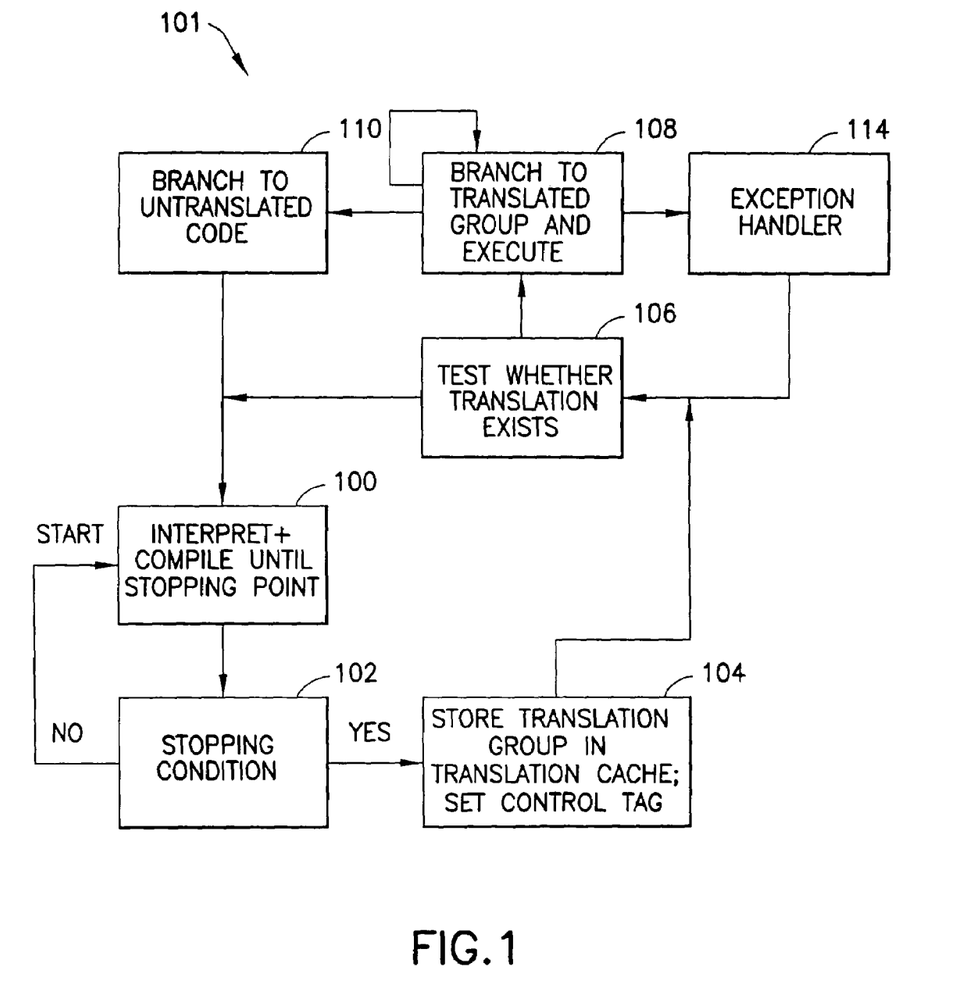
FIG. 1 is a flow diagram of one dynamic compiler in which the present invention can operate, the process preferably to be implemented in software.

Referring now to the drawings, and more particularly to FIG. 1, there is shown a flow diagram of a dynamic compiler in which the present invention operates. When the computing system in which the described steps are running boots, it transfers control to a Virtual Machine Manager (VMM) 101 which, in this embodiment, resides in a portion of firmware, although the various functional components of the VMM may be optimized in hardware. For simplicity, only the functionality relevant to the present invention is depicted in the VMM 101.

The VMM 101 then enters the interpretation and compilation at loop 100, and starts to interpret the first instructions. When a suitable stopping point, typically a back-edge of a loop, or a subroutine call or return, is encountered, a stopping condition is tested 102.

The stopping condition tests whether a compilation (or "translation") has reached the desirable instruction-level parallelism (ILP), or has exceeded a predetermined cap on the translation group size.

If the stopping condition is not met, the interpreter continues to interpret instructions 100 to grow the present group.

When the group meets the stopping condition, its translation is stored in a translation cache for future use 104, a control tag associated with the migrant code that resulted in the translation is set (the tag to be described in detail later), and a test is performed to determine whether a translation exists for the instruction to be executed immediately after the current group 106. In a software implementation of the invention, such a test would examine the tag (which could be a single bit) associated with the next instruction using a test-tag-bit or load-and-test-tag-bit instruction. A hardware implementation would read the tag bit when performing instruction fetch. If the tag for the next instruction does not indicate that a translation exists, the interpretation and compilation loop 100 is reentered, and the next group is translated.

However, if the tag test shows that a translation starting at the present address already exists, then control transfers to that translated code 108. Execution now happens at full native code speed. In the case where the native representation is VLIW, no further lookup overhead is incurred since VLIW groups can transfer control directly among each other.

When a branch within translated code branches to previously untranslated code 110, then the system returns to the interpretation and compilation loop 100.

A secondary exit 114 from execution of translated code (such code residing in translation cache) is also possible, when an exception occurs. Then the VMM sets up the correct exception environment according to the architecture specification, including identification of the exception cause, offending address, and various special purpose registers which can be queried by exception handlers. Then, a lookup is performed on the address of the exception handler. If the exception handler is resident in the cache, control transfers back directly to the translation of the exception handler in the translation cache. Otherwise, the exception handler has to be translated and control transfers to the interpretation and compilation loop 100.

Figure 2:
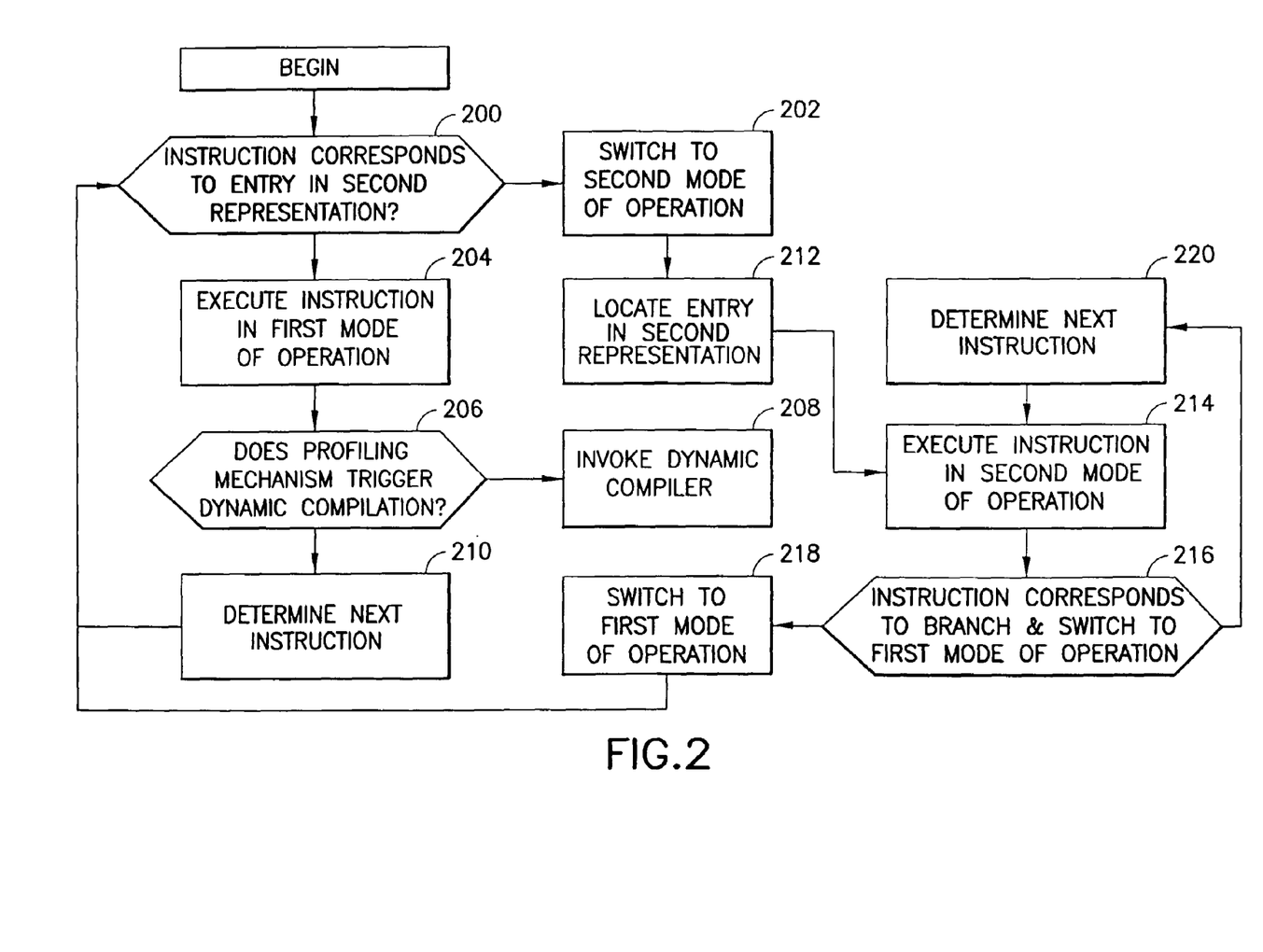
FIG. 2 is a flow diagram describing the operation of a microprocessor with dual operation modes supporting dynamic binary translation through a control transfer architecture, the operation preferably to be implemented in hardware.

Referring now to FIG. 2, there is shown a flow diagram of the processing of an instruction stream in a microprocessor system supporting dynamic binary translation.

In step 200, the current instruction from a first representation (original/migrant program representation) is tested to determine if it corresponds to an entry point in the second/native representation (corresponding to the starting point of a translated sequence of instructions). The test is performed by examining a control tag associated with the instruction, as described in further detail below. If such a correspondence exists, processing continues with step 202. Otherwise, processing of the current instruction from the first representation continues with step 204.

In step 204, the current instruction is executed in the first mode of operation. Optionally, this step may include additional operations, including, but not limited to, bookkeeping and profiling functions.

In step 206, a test is performed to determine if a profiling mechanism triggers a dynamic compilation event. This test shall be deemed representative of any other mechanism which can trigger dynamic compilation, such as may be implemented using processor interrupts, program counter sampling, or any other profiling technique. If a dynamic compilation event is triggered, control is transferred to a "dynamic compiler" 208, which may consist of hardware and software components, or any combination thereof. In one embodiment, the dynamic compiler would be implemented as software and perform the loop represented by blocks 100, 102, 104, and 106 of FIG. 1, although depending on the implementation (parallel compilation as in FIG. 1 or separate compilation in FIGS. 2 and 3), the compiler can use the interpret step 100 either only to guide the compilation, or to perform execution. Otherwise, processing continues with step 210.

In step 210, the next instruction in the first program representation corresponding to an instruction to be executed in a first mode of operation is determined. Processing continues with this instruction now being the current instruction in step 200.

In step 202, an instruction from a first representation to be executed in a first mode of operation (original program representation) has been determined to correspond to an entry point in the second representation to be executed in a second mode of operation (corresponding to the starting point of a translated sequence of instructions). A switch in the operating mode is performed to enable the processor to execute instructions from the second mode of operation.

In step 212, the corresponding entry point (typically the instruction address of the first instruction of a sequence) is located in the second representation to determine the address of a first instruction to execute from the second representation in a second mode of operation. The particular process for performing this step is described below in connection with FIG. 5. Steps 202 and/or 212 may optionally contain additional operations to transfer control from the first to the second representation, including, but not limited to, bookkeeping and profiling functions.

In step 214, an instruction from the second program representation is executed in the second mode of operation. Optionally, this step may include additional operations, including, but not limited to, bookkeeping and profiling functions.

In step 216, a test is performed to determine whether the current instruction from the second representation corresponds to a "branch and switch mode," i.e., branch to an instruction address in the first representation to be executed in a first mode of operation. If so, that instruction address is determined, and control is transferred to step 218. Otherwise, processing continues with step 220. Along with the check at step 216, it could be determined, by checking the corresponding tag, whether the instruction in the first representation to be transferred to has a corresponding translation in the second representation.

In step 218, a mode switch is performed to enable the processor to execute instructions from the first mode of operation. The branch target address of the "branch and switch mode" instruction is determined and used to determine a current instruction to be processed in a first mode of operation by the microprocessor in step 200. Step 218 may optionally contain additional operations to transfer control from the second to the first, including, but not limited to, bookkeeping and profiling functions.

In step 220, the next instruction in the second representation is determined. Processing continues with this instruction now being the current instruction in step 214.

Figure 3:
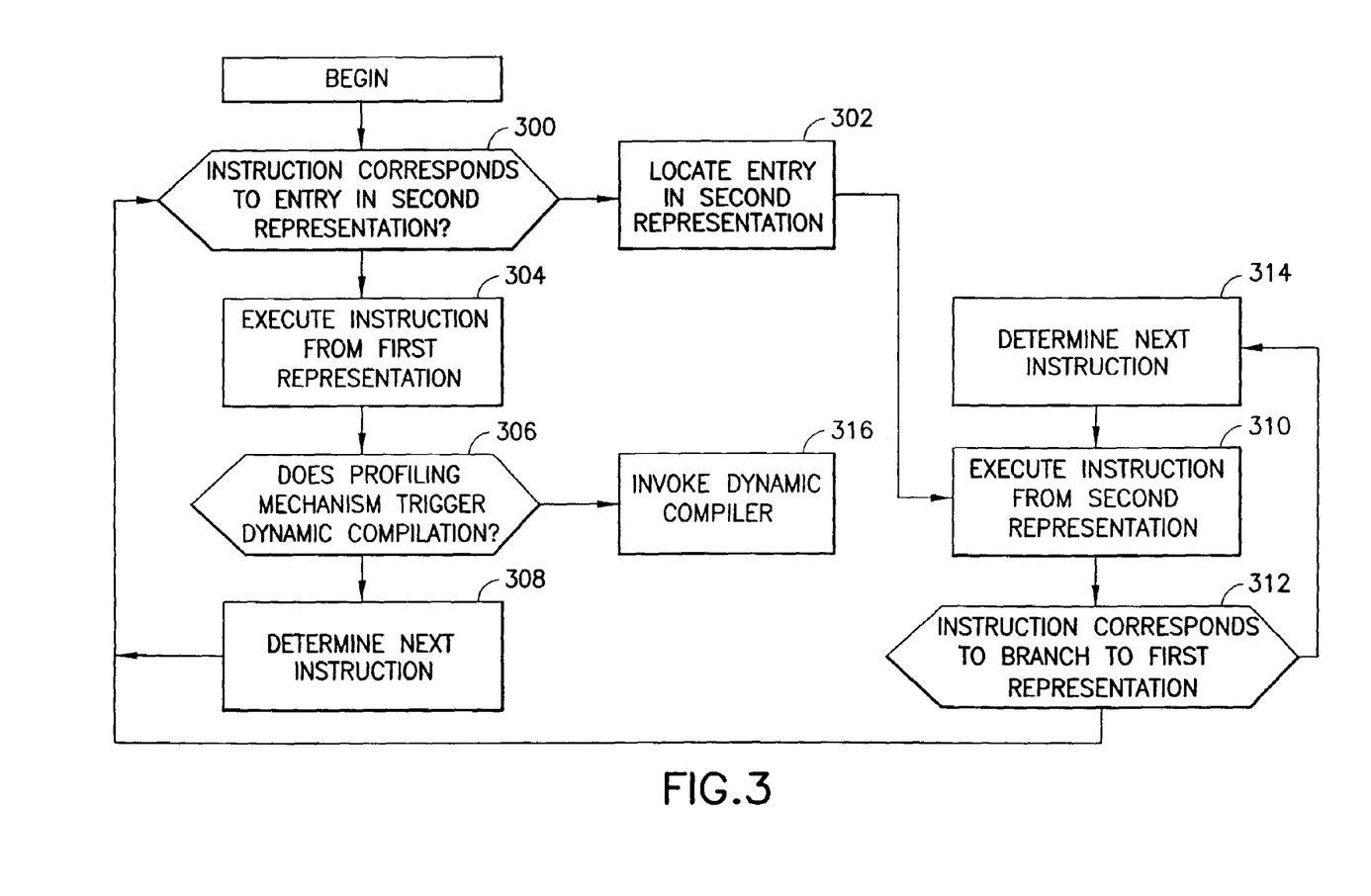
FIG. 3 is a flow diagram describing the operation of a microprocessor supporting dynamic optimization through a control transfer architecture, the operation preferably to be implemented in hardware.

Referring now to FIG. 3, there is shown a flow diagram describing the processing of an instruction stream in a microprocessor system supporting dynamic optimization.

In step 300, the current instruction from a first/migrant representation (original program representation) is tested to determine whether it corresponds to an entry point in the second/native representation (corresponding to the starting point of an optimized sequence of instructions). The test is performed by examining a control tag associated with the instruction, as described in further detail below. If such a correspondence exists, processing continues with step 302. Otherwise, processing of the current instruction from the first representation continues with step 304.

In step 304, the current instruction is executed. Optionally, this step may include additional operations, including, but not limited to, bookkeeping and profiling functions.

In step 306, a test is performed to determine whether a profiling mechanism triggers a dynamic compilation event. This test shall be deemed representative of any other mechanism which can trigger dynamic compilation, such as may be implemented using processor interrupts, program counter sampling, or any other profiling technique. If a dynamic compilation event is triggered, control is transferred to a "dynamic compiler" 316, which may consist of hardware and software components, or any combination thereof. In one embodiment, the dynamic compiler would be implemented as software and perform the loop represented by blocks 100, 102, 104, and 106 of FIG. 1, although depending on the implementation (parallel compilation as in FIG. 1 or separate compilation in FIGS. 2 and 3), the compiler can use the interpret step 100 either only to guide the compilation, or to perform execution. Otherwise, processing continues with step 308.

In step 308, the next instruction in the first program representation is determined. Processing continues with this instruction now being the current instruction in step 300.

In step 302, an instruction from a first representation (original program representation) has been determined to correspond to an entry point in the second representation (corresponding to the starting point of a dynamically optimized sequence of instructions). The corresponding entry point (typically the instruction address of the first instruction of said sequence) is located in the second representation to determine the address of a first instruction to execute from the second representation. Step 302 may optionally contain additional operations to transfer control from the first to the second representation, including, but not limited to, bookkeeping and profiling functions.

In step 310, an instruction from the second program representation is executed. Optionally, this step may include additional operations, including, but not limited to, bookkeeping and profiling functions.

In step 312, a test is performed to determine whether the current instruction from the second representation corresponds to a branch to an instruction address in the first representation. If so, that instruction address is determined, and control is transferred to step 300 which will use the branch target as the current instruction. Branching to an instruction in the first representation may optionally contain additional operations to transfer control from the second to the first representation, including, but not limited to, bookkeeping and profiling functions. Otherwise, processing continues with step 314.

In step 314, the next instruction in the second representation is determined. Processing continues with this instruction now being the current instruction in step 310.

Figure 4:
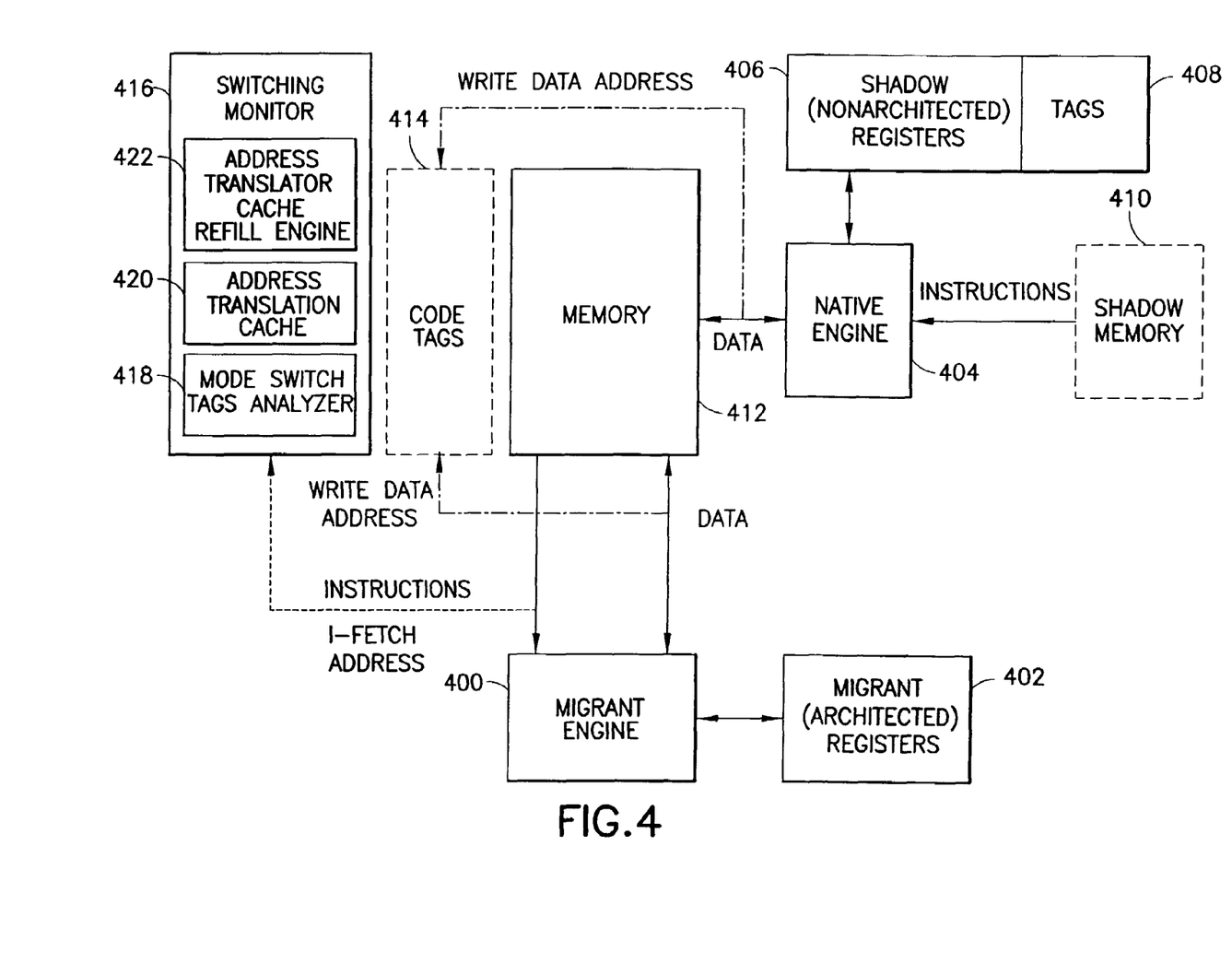
FIG. 4 shows a dual-mode execution processor with switching monitor according to Silberman and Ebcioglu, "An Architectural Framework for Supporting Heterogeneous Instruction-Set Architectures", IEEE Computer, June 1993.

Referring now to FIG. 4, there is shown a dual-mode execution processor employing the present invention. The processor of FIG. 4 is designed to implement the process steps described in connection with FIGS. 1-3.

The system includes two processor engines, representing a migrant engine 400 (that is, a processor implementing a first instruction set architecture) with processing resources, including a register file 402, used for processing instructions from the first instruction set architecture, and a native engine 404 (that is, a processor implementing a second instruction set architecture) with processing resources, including a register file 406, optionally containing tags 408, which may contain, for instance, information about misspeculation and exception recovery for aggressive ILP compilation, and a shadow memory 410, used for storing instructions from the second instruction set architecture. The shadow memory is not used by and/or is inaccessible to migrant engine 400.

The migrant and native engines 400 and 404 can be two physically different engines, or two modes of a single processing engine, with the two modes corresponding to processing capabilities of first and second instruction set architectures. Furthermore, some or all of the processing resources, including the register file, may be shared by the migrant and native engines or the two different modes of a single unified engine.

In the system described in FIG. 4, both engines connect to a common memory system 412. The separate shadow memory 410 supplies instructions for the native engine 404, although the shadow memory 410 can be implemented as a section of the common memory 412 which is not accessed and/or not accessible by the migrant engine 400.

FIG. 4 furthermore depicts code tags 414 which are used, for example, to identify self-modifying code which is accessed during data write accesses to guarantee correct operation of a system employing self-modifying code, as well as control tags to be used in accordance with the invention. The code tags are stored in memory 412 in connection with associated code.

The switching monitor 416 is provided for determining whether to switch from execution of code in a migrant representation to code in a native representation. Switching monitor 416 includes a mode switch analyzer 418, which is responsible for detecting if an instruction from a first instruction stream (to be executed in the migrant engine 400) corresponds to an entry point of an instruction stream in the second representation (which can be executed in the native engine 404). It does this by examining a designated field of the code tag associated with the particular migrant instruction. If the code tag indicates that no translated version of the instruction exists, then the migrant instruction is executed normally by migrant engine 400 and instruction profiling determines whether a native version of the instruction will be generated. If, however, the tag indicates that the migrant instruction has previously been translated into a native representation, the address of the translated instruction is provided to native engine 404, which attempts to read the translated representation from address translation cache 420. If the translated version is not in the cache, a cache miss occurs and the native representation can be retrieved from memory 412. Since this latter operation is performed with lower frequency, it is amenable to caching techniques whereby only frequently used translations are stored in a fast lookup table, backed by a slower hardware- or software-based translation cache refill mechanism when a cache miss occurs. Address translation cache refill engine 422 will determine, based on known caching principles, whether to store the native instruction retrieved from memory 412 in address translation cache 420. Thus, the switching monitor 416 implements operations 200, 202 and 216 of a binary translation system (with reference to FIG. 2), and steps 300, 302, and 312 in a dynamic optimization system (with reference to FIG. 3).

The system of FIG. 4 with improved switching monitor represents a significant advance over prior art systems, because prior art switching suffers either excessive memory consumption requirements if a switch monitor as described in May, op. cit., is used wherein a switch entry is associated with each instruction address, or from massive hardware requirements if all known entries are to be stored in a CAM memory structure, or from slow performance if all migrant instruction addresses must be read from cache/memory. The present invention improves on these prior techniques because the determination of whether a translation exists can be effected by the relatively fast technique of examining a field within the code tag associated with an instruction, rather than perform a cache fetch for possible translated versions in each case. Therefore, the current invention improves switch detection and translation without unduly degrading performance or posing massive hardware requirements.

Although the switching monitor has been described in terms of a binary-translation embodiment in accordance with FIG. 2, it is also applicable to dynamic optimization systems in accordance with FIG. 3.

Figure 5:
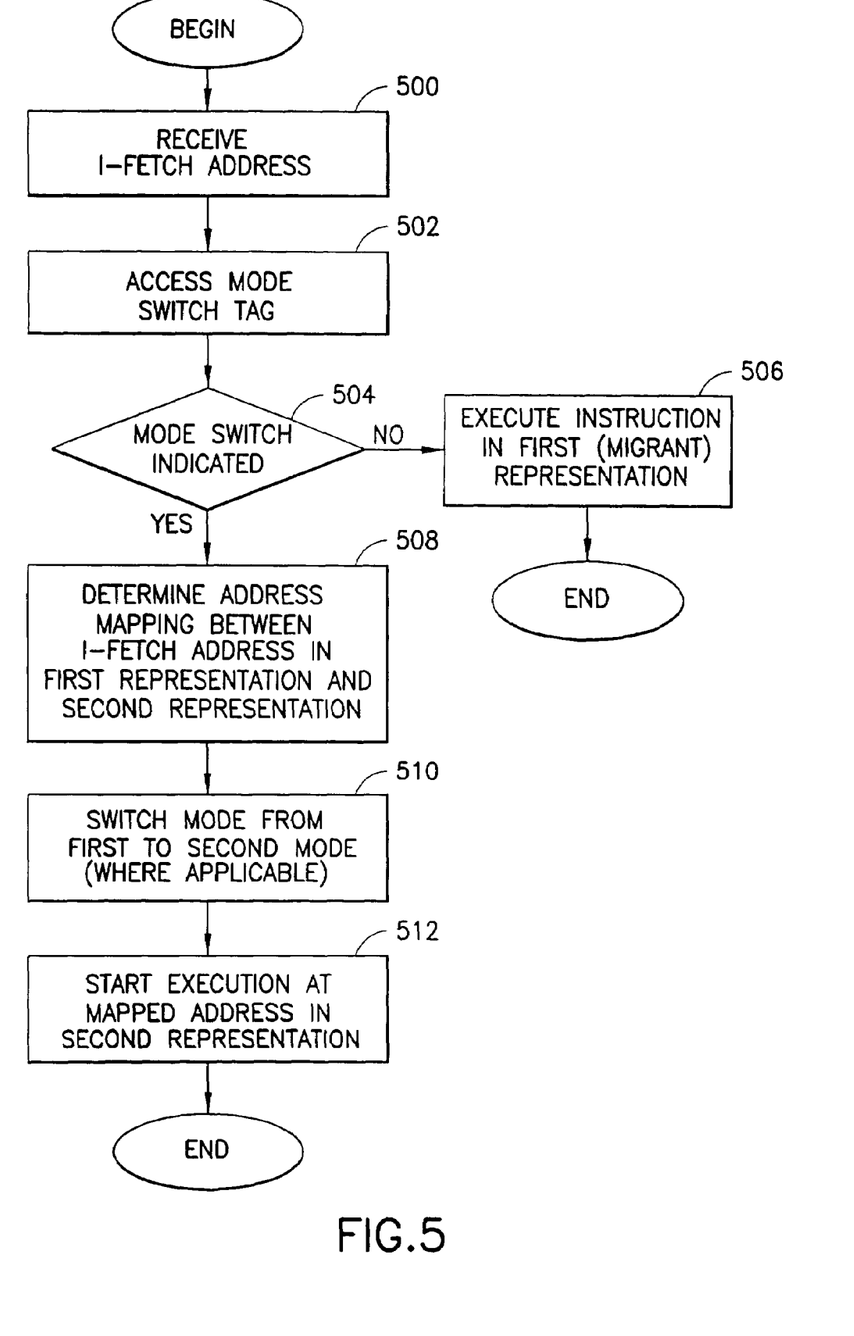
FIG. 5 shows a flow diagram of the operation of a switching monitor in accordance with a first embodiment of the present invention.

Referring now to FIG. 5, there is shown a flow diagram representing the operation of the switching monitor 416 of FIG. 4.

In step 500, the instruction fetch address is received by the mode switch tags analyzer 418, and in step 502, the corresponding mode switch tag for the instruction is read from the instruction's tag. In step 504, the mode switch tag is tested. If the mode switch tag does not indicate a mode switch, i.e., it does not indicate that a translated version of the instruction has been created, it is determined that the instruction from the first representation should be executed in a first mode in step 506, and the method terminates and the instruction is executed by migrant engine 400. Otherwise, processing continues to step 508. Step 508 determines the address mapping between the instruction fetch address supplied in step 500 corresponding to an instruction address of an instruction in the first representation, and a corresponding entry point to the second representation. In step 510, it is indicated to the processor that a mode switch has been detected (such as would be the case for dynamic translation systems; dynamic optimization systems would not involve a mode switch). In step 512, the mapped address is supplied to the microprocessor (native engine 404) to indicate the first instruction address in the second mode of operation.

In this description, steps 500, 502, and 504 correspond to step 200 of FIG. 2. Furthermore, step 508 corresponds to step 212 of FIG. 2 (and in the case of a dynamic optimization system, to step 300 of FIG. 3).

Figure 7:
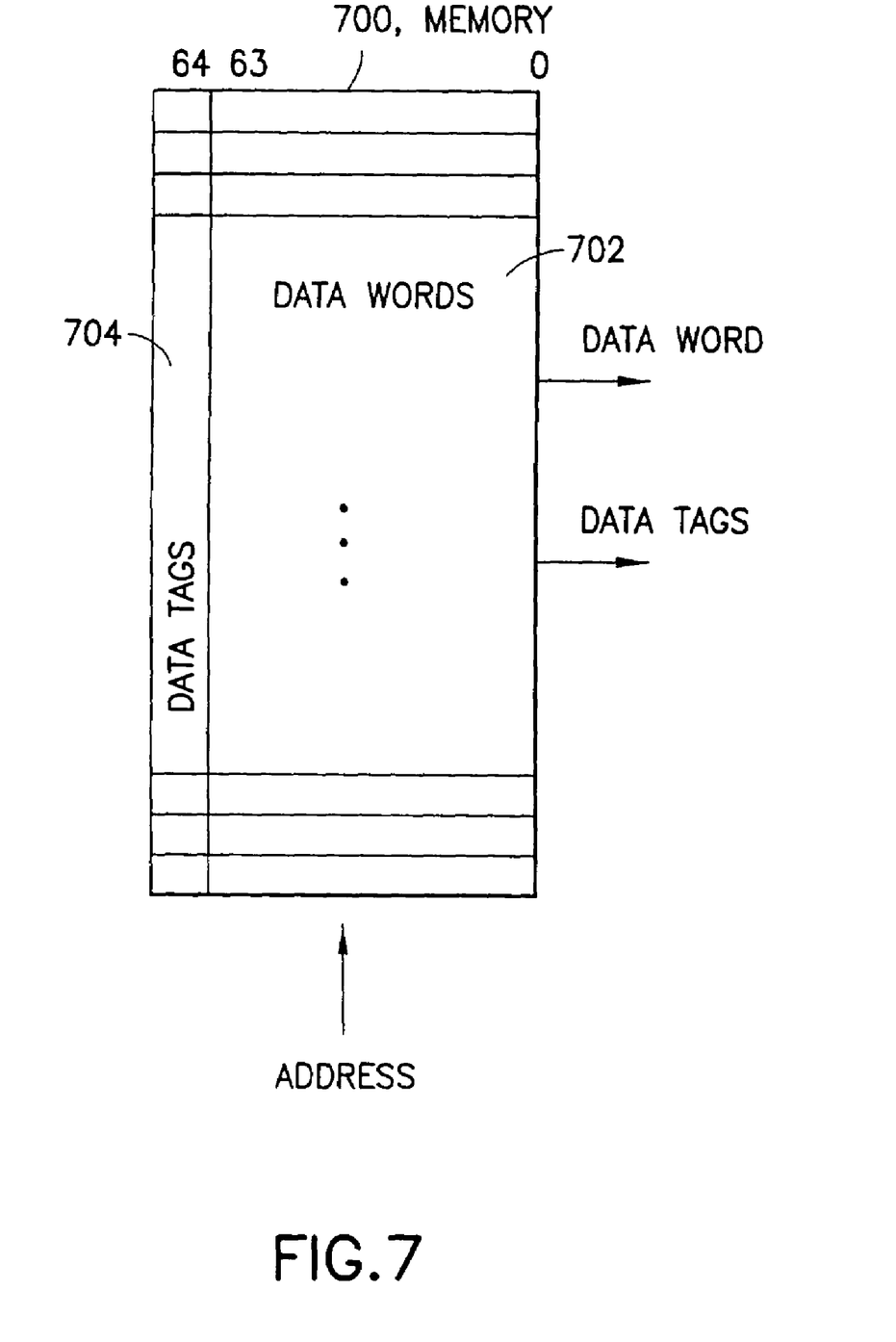
FIG. 7 shows a first embodiment of a memory system to support the method and apparatus disclosed in the present invention.

The multiple steps can be reordered or executed in parallel. In particular, steps 500 and 502 can be executed in parallel with the instruction fetch if a memory organization according to FIG. 7 is used, wherein one or more tag bits are stored in conjunction with the data and instruction words in the system memory, and the caching hierarchy.

Figure 6:
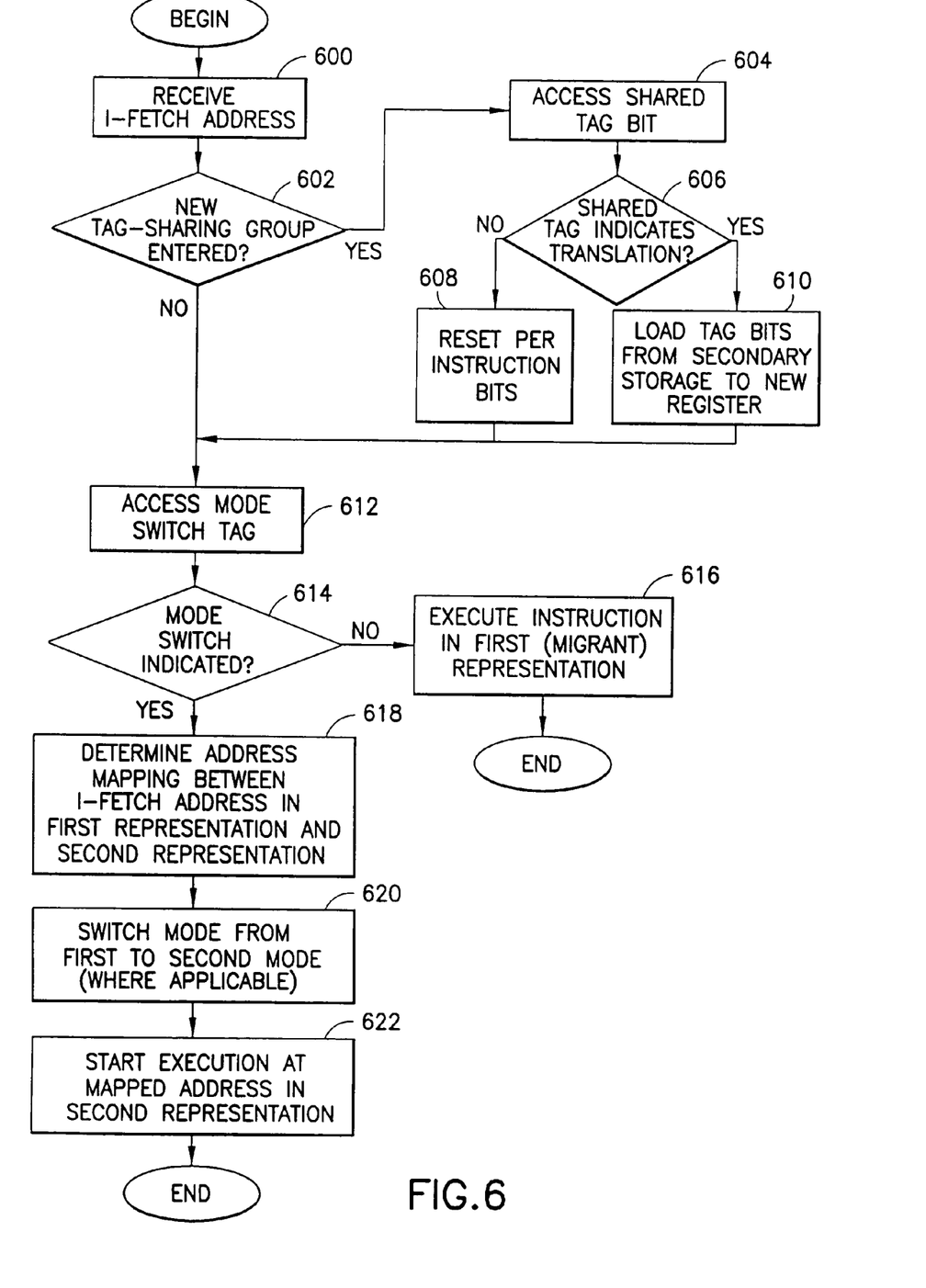
FIG. 6 shows a flow diagram of the operation of a switching monitor in accordance with a second embodiment of the present invention.

Referring now to FIG. 6, there is shown a flow diagram representing an alternative mode of operation of the switching monitor 416 of FIG. 4, in which there is a single mode switch tag associated with a group of data words.

In step 600, the instruction fetch address for one of the instructions in the group of instructions is received by the mode switch tags analyzer 418, and in step 602 it is determined whether the instruction belongs to a new group that has been previously encountered. (This can be determined by storing the address of the group, and comparing the address of the current group with the address of the group associated with the instruction just encountered.) If yes, the tag associated with the new group is accessed 604 and examined 606. If the shared tag indicates that a translation does not exist for any data word in the group, a bit of 0 is associated with each data word in the group 608, for instance by storage of the value 0 in a register associated with each data word. If the shared tag indicates that at least one of the data words has a translation, the tag for each data word is retrieved 610 (e.g., from a secondary storage location) and stored in a respective register associated with each data word. Following steps 608 or 610, or if the answer at block 602 is no, the mode switch tag associated with the current instruction is read from its associated register 612. At step 614, it is determined whether the tag bit indicates that a translation for the current data word exists (which is the case if the tag is a 1), and if not, at step 616 the instruction is executed in the first (migrant) representation. Otherwise, processing continues to step 618. Step 618 determines the address mapping between the instruction fetch address supplied in step 600 corresponding to an instruction address of an instruction in the first representation, and a corresponding entry point to the second representation. In step 620, it is indicated to the processor that a mode switch has been detected (such as would be the case for dynamic translation systems; dynamic optimization systems would not involve a mode switch). In step 622, the mapped address is supplied to the microprocessor (native engine 404) to indicate the first instruction address in the second mode of operation.

In this description, steps 600-614 correspond to step 200 of FIG. 2. Furthermore, step 618 corresponds to step 212 of FIG. 2 (and in the case of a dynamic optimization system, to step 300 of FIG. 3).

As in the case of the embodiment of FIG. 5, the multiple steps can be reordered or executed in parallel. In particular, steps 600-612 can be executed in parallel with the instruction fetch if a memory organization according to FIG. 8 is used, wherein a tag bit is stored in conjunction with a group of data and instruction words in the system memory, and the caching hierarchy.

FIG. 7 shows a memory system to support the method and apparatus of one embodiment of the present invention. In particular, the memory 700 will be capable of storing a number of data words 702 each capable of having an associated tag 704. The tag may, in a preferred embodiment, consist of a single bit which can be set by the dynamic compiler 208 of FIG. 2 (or dynamic compiler 316 of FIG. 3) in the event that a translated version of the instruction (data word) has been generated. By setting a mode switch tag when new translations are generated, the dynamic compiler thereby indicates the starting point address in the first (migrant) representation of the instruction by setting the tag at that address. Thus when the tag at this address is loaded, the system can determine whether it corresponds to the starting address of a translation, and if so, the starting address being used to map the starting point in the second (native) representation. In another embodiment of the invention, the tag can be expanded to a number of bits, to indicate, for instance, profile information about the data word, such as a counter to keep track of the number of times the instruction has been executed in migrant mode. In addition, such a tag could include information describing the exception behavior of the data word.

Figure 8:
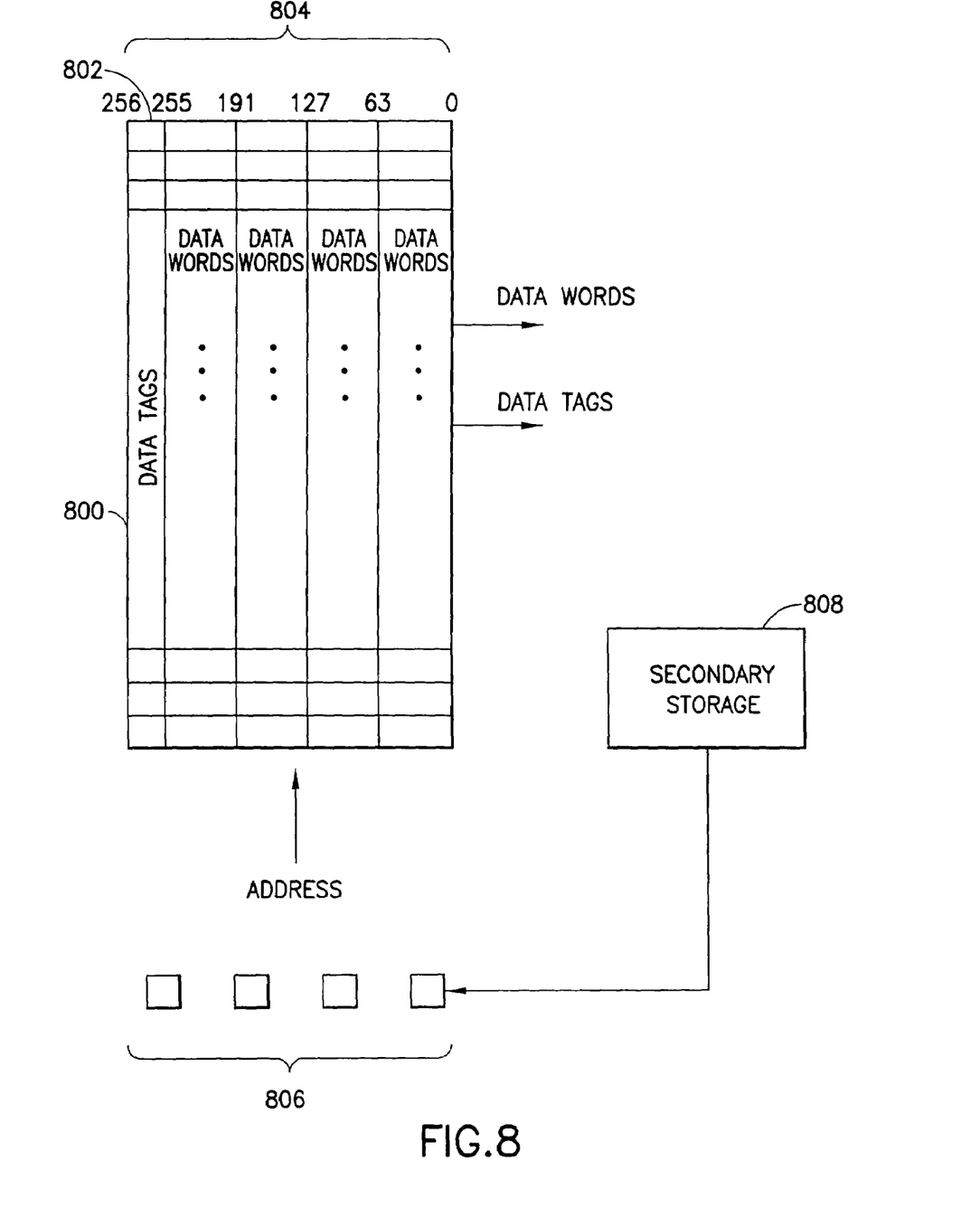
FIG. 8 shows a second embodiment of a memory system to support the method and apparatus disclosed in the present invention.

FIG. 8 shows a memory system to support another embodiment of the method and apparatus of the present invention. In particular, the memory 800 will be capable of storing a group of data words 804, the group having a shared tag 802. The shared tag 802 may, in a preferred embodiment, consist of a single bit which can represent the "OR" of tags associated with each data word in the group 804. Thus, in one embodiment a group tag value of 0 would indicate that no instruction in the group has an associated translation. The tag associated with each data word in the group can be stored in a secondary storage location 808 (optionally decompressed) and, following a read of the individual tags from location 808, stored in registers 806, each register associated with a different data word. When one or more instructions in a group of instructions is to be set by the dynamic compiler 208 of FIG. 2 (or dynamic compiler 316 of FIG. 3) in the event that a translated version of at least one data word in the group has been generated, the corresponding tag is set and stored in secondary storage 808 (again, optionally compressed). By setting a mode switch tag when new translations are generated, the dynamic compiler thereby indicates the starting point address in the first (migrant) representation of the instruction by setting the tag at that address. Thus when the tag at this address is loaded, the system can determine whether it corresponds to the starting address of a translation, and if so, the starting address being used to map the starting point in the second (native) representation. As in the case of the embodiment described in connection with FIG. 7, a tag can be expanded to a number of bits, to indicate, for instance, profile information about the data word, such as a counter to keep track of the number of times the instruction has been executed in migrant mode. In addition, such a tag could include information describing the exception behavior of the data word.

Mode switch tag bits do not need to be propagated throughout the memory hierarchy immediately, for instance, when it is acceptable to execute code from the old (presumably unoptimized but nevertheless correct) representation while the tag bits are being propagated. This is because one issue that may be problematic is that tag bits are set by a system's load-store unit, which operates on a different part of the memory hierarchy than the instruction fetch unit. However, the tags of the present invention are used by the instruction fetch hierarchy, and it may take time to propagate the information down one hierarchy and up the other hierarchy. If it were critical that the tags be up to date all the time, then it would be necessary to stop the system until this propagation has occurred—but since the penalty of using out of date tags is to use a less optimized version of the code than the new translated/optimized/improved version, it is preferable to keep missing entry points and execute slower versions than to stop the execution altogether.

In a preferred embodiment of the invention, the tag bits described to indicate a mode switch are used only in conjunction with instruction words from the first program representation. Therefore, the very same tag bits can be used for other purposes to indicate a variety of conditions for data words and instructions from the second representation. One such use for tags may be to implement a capability-based security mechanism for data references.

The present invention for identifying control transfer and mode switch conditions can be used in conjunction with any address mapping strategy, e.g., as described in M. Gschwind, "Method and apparatus for determining branch addresses in programs generated by binary translation", IBM Invention Disclosure YOR8-1998-0334, Yorktown Heights, N.Y., July 1998. Research Disclosures, vol. 41, no. 416, December 1998, (article 41698), incorporated by reference.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. In a computing system that includes dynamic compilation capability, a method for executing a computer program including controlling the execution of an instruction of the computer program, comprising the steps of:

translating an instruction from a first representation to a translated representation, and setting a tag associated with the instruction in the first representation; and prior to execution of a given instruction in the first representation, examining the tag associated with the given instruction, and if such associated tag has been set, branching to the translated version of the given instruction, for further execution of the program; and if said tag has not been set, interpreting and compiling the given instruction from said first representation, for further execution of the program;

wherein said examining of said tag is effected without first attempting a cache fetch, so that the time required to attempt a cache fetch is saved if said tag has not been set;

looking up the address of the translated version of the instruction; and executing the translated version of the given instruction, and, upon reaching the end of such execution, determining whether a subsequent instruction is to be executed, and if so, determining whether such subsequent instruction exists in a translated version by examining a tag associated with a first representation of the subsequent instruction.

2. The method of claim 1, wherein the translated version is stored in cache memory.

3. The method of claim 2, wherein the translated instruction is an optimized version of the first instruction, but in the same instruction set as the first instruction.

4. The method of claim 2, wherein the translated instruction is represented in a different instruction set than the first instruction.

5. The method of claim 1, wherein the tag is a single bit.

6. The method of claim 1, wherein the tag is represented by a field of multiple bits, said field also indicating information about the instruction in the first representation selected from the group consisting of: profile information and exception information.

7. The method of claim 1, wherein a single tag corresponds to a plurality of instructions in the first representation 8. In a computing system that executes a computer program, and includes dynamic compilation capability of the computer program, the improvement comprising:

means for translating an instruction from a first representation of the program to a translated representation, and for setting a tag associated with the instruction in the first representation;

means for, prior to execution of a given instruction in the first representation, examining, without first attempting a cache fetch, so that the time required to attempt a cache fetch is saved, the tag associated with the given instruction, and if such associated tag has been set, branching to the translated version of the given instruction, for further execution of the program;

means for interpreting and compiling the given instruction from said first representation, for further execution of the program, if said tag has not been set;

means for looking up the address of the translated version of the instruction; and means for executing the translated version of the given instruction, and, upon reaching the end of such execution, determining whether a subsequent instruction is to be executed, and if so, determining whether such subsequent instruction exists in a translated version by examining a tag associated with a first representation of the subsequent instruction.

9. The system of claim 8, wherein the translated version is stored in cache memory.

10. The system of claim 9, wherein the translated instruction is an optimized version of the first instruction, but in the same instruction set as the first instruction.

11. The method of claim 9, wherein the translated instruction is represented in a different instruction set than the first instruction.

12. The system of claim 8, wherein the tag is a single bit.

13. The system of claim 8, wherein the tag is represented by a field of multiple bits, said field also indicating information about the instruction in the first representation selected from the group consisting of: profile information and exception information.

14. The system of claim 8, wherein a single tag corresponds to a plurality of instructions in the first representation.

15. The system of claim 8, further comprising an exception handler for execution of the program when an exception in said translated representation occurs.

\* \* \* \* \*